United States Patent [19]

Kappler et al.

[11] Patent Number: 5,405,925
[45] Date of Patent: Apr. 11, 1995

[54] HARDENABLE FLUORIDATED COPOLYMER IN POWDER FORM AND ITS APPLICATION IN POWDER COATINGS

[75] Inventors: Patrick Kappler, Ecully; Jean-Luc Perillon, Bernay; Marcel Baudrand, Givors, all of France

[73] Assignee: Elf Atochem S.A., France

[21] Appl. No.: 153,398

[22] Filed: Nov. 16, 1993

[30] Foreign Application Priority Data

Nov. 23, 1992 [FR] France ................. 92 14035

[51] Int. Cl.⁶ ............... C08F 214/22; C08F 214/26
[52] U.S. Cl. ....................................... 526/255
[58] Field of Search ............................ 526/255

[56] References Cited

U.S. PATENT DOCUMENTS

| | | |
|---|---|---|
| 4,487,893 | 12/1984 | Yamabe et al. |
| 4,788,266 | 11/1988 | Koishi et al. |
| 4,877,839 | 10/1989 | Conti-Ramsden et al. |
| 4,952,653 | 8/1990 | Tomihashi et al. ........ 526/255 |
| 4,954,589 | 9/1990 | Sugawara et al. ........ 526/255 |
| 4,985,519 | 1/1991 | Koishi et al. ........... 526/255 |
| 5,043,390 | 8/1991 | Koishi et al. ........... 526/255 |
| 5,066,747 | 11/1991 | Yoshimura et al. ....... 526/255 |
| 5,079,320 | 1/1992 | Kappler et al. .......... 526/255 |
| 5,082,911 | 1/1992 | Kappler et al. .......... 526/255 |
| 5,096,989 | 3/1992 | Miura et al. ............ 526/255 |
| 5,098,972 | 3/1992 | Kappler et al. .......... 526/255 |
| 5,130,365 | 7/1992 | Koishi et al. |
| 5,142,011 | 8/1992 | Shimizu et al. .......... 526/255 |

FOREIGN PATENT DOCUMENTS 0493172 7/1992 European Pat. Off. ............ 526/255

OTHER PUBLICATIONS

FR92-14035 (abstract EP599712) Nov. 23, 1992.

*Primary Examiner*—Joseph L. Schofer
*Assistant Examiner*—N. Sarofim
*Attorney, Agent, or Firm*—Pennie & Edmonds

[57] ABSTRACT

A settable copolymer containing the copolymerization remnants of a fluoridated monomer and an allylic derivative characterized in that:
  a) The remnants of the fluoridated monomer are derived from the association of tetrafluoroethylene and vinylidene fluoride.
  b) The allylic derivative has the formula:

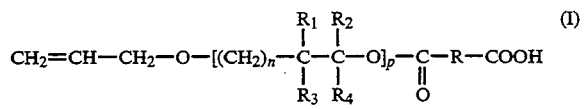

with R representing a linear, branched, or cyclic alkyl chain, not saturated, and having 2 to 12 carbon atoms.
  R1, R2, R3, and R4, may be identical or different, being chosen from among: H, $CH_3$, $CH_2$—$CH_3$, OH, $CH_2OH$
  n is 0 or 1
  p is a value from 0 to 3.

This settable copolymer is obtained by copolymerization in solution in an organic solvent. This copolymer is used in powdered paints.

8 Claims, No Drawings

HARDENABLE FLUORIDATED COPOLYMER IN POWDER FORM AND ITS APPLICATION IN POWDER COATINGS

The present invention concerns a hardenable, ne settable, fluoridated copolymer of tetrafluoroethylene ($C_2F_4$), vinylidene fluoride ($C_2H_2F_2$), and of an allylic derivative containing a

group and a carboxylic acid function. This copolymer appears in the form of particles easily reduced to powder by simple grinding at room temperature. This copolymer is especially adapted to powder-based coatings, e.g., by electrostatic spraying.

Techniques using powder-based coatings have been recommended for several years in order to avoid environmental pollution by paints containing solvents.

Moreover, coatings based on fluoridated polymers generally have the advantage of resisting weathering and solar radiation. For vinylidene polyfluoride, durability over time is excellent, but the coatings are difficult to apply. The coil coating technique requires the use of hot solvents. Vinylidene polyfluoride can likewise be applied as a powder, but in that case a costly cryogenic grinding beforehand is necessary. With copolymers of $C_2H_2F_2$, in particular the $C_2H_2F_2$—$C_2F_4$ and $C_2H_2F_2$—$C_2F_4$—$C_3F_6$ (hexafluoropropylene) copolymers, placement into solution is easier, but cryogenic grinding is still necessary to create the powders. That is the case, for example, for the products obtained under French Patents FR.A 2488260, FR.A 2646428, and FR.A 2654432.

In EP 301557 there is a description of the manufacture of powder for paint with a copolymer obtained from a basis of any of the following: $C_2H_2F_2$, $C_2F_4$, $C_3F_6$, $C_2F_3Cl$ (trifluorochloroethylene), and an ethylene compound bearing as a reticulable reactive principle a hydroxy function or merely a carboxyl group. Under these conditions, a copolymer is obtained in a mass that is difficult to grind after drying and which must be ground in a hammer grinder, which is to say a system of cryogenic grinding, in order to be reduced to a powder.

Coatings that can be applied in powder form are also described in U.S. Pat. No. 4916188 and JP 2060968. According to those documents, these are hydroxylated fluoridated copolymers and blocked isocyanates.

In a general way, the association of a fluoridated olefin monomer and carboxylated monomers is known for paint applications in a solvent medium. For example, in FR.A 2631627, a copolymer of $C_2F_3Cl$ of vinyl ether, of vinyl ester, and of a monomer bearing an acid group such as allyloxyacetic, methacrylic, or vinylacetic acid. The association of such monomers with $C_2F_2H_2$—$C_2F_4$ couplets does not allow the production of a copolymer capable of being present in powder form. The same is true for JP.3212459, according to which $C_2F_3Cl$ and vinyl ester or vinyl ether are copolymerized in association with a monomer of formula:

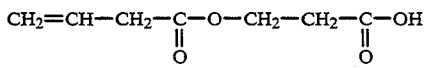

In addition to the fact that this formulation cannot lead to a copolymer capable of being reduced to a powder, the monomer structure copolymerizes in an imperfect way with $C_2F_2H_2$.

The settable copolymer according to the invention containing the copolymerization remnants of a fluoridated monomer and an allylic derivative characterized in that:

a) The remnants of the fluoridated monomer arise from the association of $C_2F_4$ and $C_2H_2F_2$.
b) The allylic derivative has the formula:

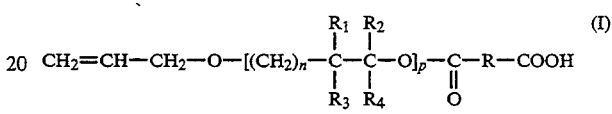

with R representing a linear, branched, or cyclic alkyl chain, not saturated, and having 2 to 12 carbon atoms.

R1, R2, R3, and R4, may be identical or different, being chosen from among: H, $CH_3$, $CH_2$—$CH_3$, OH, $CH_2$—OH n is 0 or 1 p is a value from 0 to 3.

The association per 100 moles of all the fluoridated monomers of (a) is usually formed of
45 to 85 moles of $C_2H_2F_2$,
15 to 55 moles of $C_2F_4$.

It is preferable that the settable fluoridated copolymer according to the invention be characterized insofar as it contains the remnants of monomers arising from:
45 to 85 moles and preferably 50 to 75 moles of $C_2H_2F_2$,
15 to 55 moles and preferably 25 to 50 moles of $C_2F_4$,
3 to 20 moles and preferably 4 to 10 moles of the allylic derivative (I) per 100 moles of the $C_2H_2F_2$—$C_2F_4$ grouping.

Among the preferred allylic derivatives (I), we might cite compounds of the following formulas:

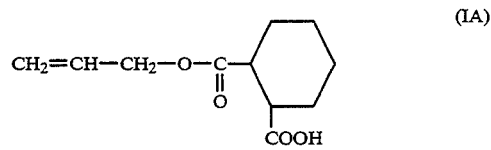

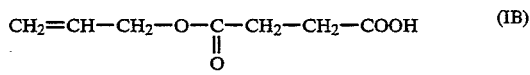

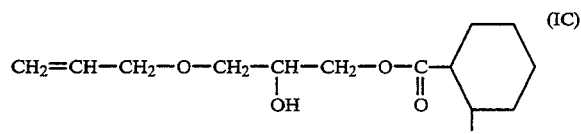

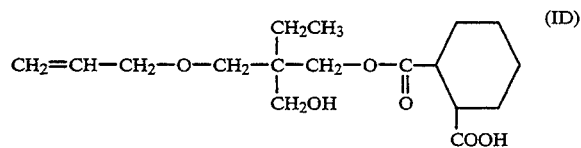

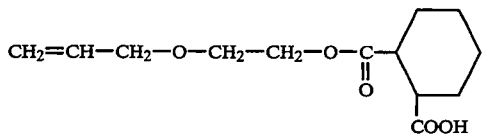

(IE)

This settable copolymer is recovered at the end of copolymerization in the form of dispersed particles that are easily reduced to powder by grinding at room temperature.

It is possible for this settable copolymer to contain the remnants of one or several other monomers that can copolymerize with $C_2H_2F_2$ or $C_2F_4$. Among such monomers, we might mention $C_2F_3Cl$ $C_3F_6$, $C_2F_3H$ (trifluoroethylene), butyl vinyl ether, ethyl vinyl ether, isobutyl vinyl ether, as well as the compounds having the formulas:

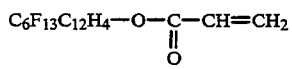

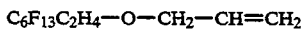

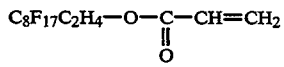

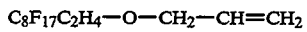

However, these monomer remnants must be present in relatively small amounts and may not represent more than 5 units for 100 units of the total of $C_2H_2F_2$—$C_2F_4$ units. The fact of having the remnants of such a comonomer in the settable copolymer tends to cause the loss of the characteristic of grinding at room temperature and to limit the drying temperature of the copolymer at the end of manufacture. Finally, as far as possible, it is recommended not to have the remnants of such a comonomer in the settable copolymer.

The molecular weight of the settable copolymer as measured by steric exclusion chromatography in tetrahydrofurane at 20° C. is usually in the range of 2,500 to 30,000, expressed in polystyrene equivalents, and most often between 6,000 and 15,000.

The known settable fluoridated copolymers seem never to have been obtained in a dispersed form. Copolymers are generally prepared by polymerization in solution, and the direct elimination of the polymerization solvent never leads to a dispersion, but to the formation of a more or less rubbery amorphous mass.

Another known means of retrieving the copolymer at the end of polymerization consists of precipitating the polymerization medium in a non-solvent medium such as water. At that stage, there is often a re-agglutination of the copolymer, a re-agglutination that always occurs when drying is done at temperatures above 40° C. In order to bring the product to a powder form, this re-agglutination requires a preliminary grinding. That grinding cannot be done at room temperature for several reasons. One of these reasons arises from the product itself, which is present in a rubbery form. Another reason is that the heat released by grinding promotes the re-accretion of the ground particles. That is why, in order to avoid these drawbacks, the conversion to powder form of settable copolymers is done by cryogenic grinding at a temperature below 0° C. Such grinding is still coarse and difficult, and requires re-grinding of the particles obtained after having mixed them with the other paint ingredients such as pigment, filler, ultra-violet absorbing agent, and others after having passed them through an extruder to homogenize the whole.

The benefit of settable copolymers according to the invention, arising from the presence of an allylic compound including a

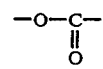

group and a carboxyl function, is that they are obtained directly in particle form, particles which, moreover, can be ground directly at room temperature. Under those conditions, it is possible either to reduce the copolymer obtained to a powder by traditional, relatively simple grinding at room temperature and simply to mix it with the other paint ingredients before use, or else to mix the other paint ingredients with the dried copolymer particles before grinding all of it after passing it through an extruder. In any case, cryogenic grinding is avoided and the savings of grinding and/or passing through an extruder are realized.

Settable copolymers according to the invention also have the advantage of not clumping together again upon drying, which allows them to be dried efficiently at temperatures of 60° to 90° C. for periods of more than ten hours without problems.

The allylic derivative (I) is obtained in the classical way by a palpably equimolecular reaction of an allylic alcohol and a dicarboxylic anhydride at a temperature of around 40° to 80° C. in the presence of a catalyst, if needed, such as triethylamine. The allylic alcohol is selected from among alcohols of the formula

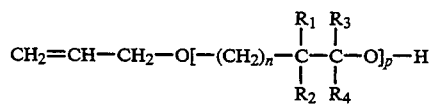

with R1, R2, R3, and R4 being as defined above. The anhydride of the acid is selected from among products of the formula

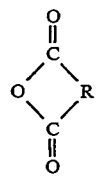

with R being as defined above.

The settable copolymer is obtained by all the known methods for polymerizing fluoridated monomers. However, it is mainly obtained by the known process of radical polymerization in solution. The process consists of copolymerization of the group of monomers in an organic solvent medium in the presence of an organosoluble initiator at a temperature between around 30° and 120° C. inclusive, preferably between 40° and 80° C., and preferably under a pressure between 15 and 40 bars.

The settable copolymer is obtained by copolymerization of $C_2F_2H_2$, $C_2F_4$, and the allylic derivative (I) as defined above. For each 100 moles of polymerized fluoridated monomers, there are used:

45 to 85 moles, and preferably 50 to 75 moles, of $C_2H_2F_2$, 15 to 55 moles, and preferably 25 to 50 moles, of $C_2F_4$, with which the allylic derivative (I) as defined above is associated.

In order to obtain a settable copolymer having the best properties, 3 to 20 moles, and preferably 4 to 10 moles, of the allylic derivative are usually associated with each 100 moles of the grouping of the two fluoridated monomers.

According to a preferred method of polymerization, the solvent is heated to the selected reaction temperature in a stirred reactor that has been de-gassed beforehand. A mixture of the various monomers is first placed into the reactor under such conditions that the pressure is equal to the selected pressure. The composition of the initial loading of the reactor depends on the reactivity of the various comonomers and the composition of the desired copolymer. The weight ratio of monomer to solvent is generally between 0.05 and 1.

When the reaction pressure and reaction temperature have been reached, the polymerization initiator is placed into the reactor. The formation of polymers is seen by a drop in pressure that is compensated for by the addition of the mixture of fluoridated monomers.

It is possible to add a mixture of fluoridated monomers of a molar composition identical to that brought in at first. It is likewise possible to take into account the reactivities inherent in each comonomer and to adjust the composition of the mixture added in during polymerization to make a copolymer of homogeneous composition.

The allylic derivative may also be added in during polymerization. The ratio of this derivative added in, preferably continuously, is generally greater than the ratio of allylic derivative inserted initially, taking the greater reactivity of this derivative into account.

The allylic derivative is preferably added in such a way that the relationship between the speed of addition of the allylic derivative and the speed of addition of the fluoridated monomers remains constant during the polymerization.

Addition of the monomer mixture to maintain pressure is sustained long enough to achieve a dry extract on the order of 10% to 60%, preferably 15% to 40%.

Volatile monomers can be eliminated by de-gassing. After polymerization, the copolymer is extracted from the reaction medium by precipitation in a liquid that does not dissolve the copolymer but is miscible with the solvent of the reaction medium. The volume of the liquid of precipitation generally represents 1 to 10 times the reaction volume. Water is an excellent liquid that does not dissolve the copolymer. The reaction medium is preferably poured into the liquid that does not dissolve the copolymer with stirring at a temperature between room temperature and 70° C. Unlike other solids of the same type, the copolymer recovered by filtration is not present in massive form, but as dispersed particles easily dried by heat without clumping together. The distribution of the particles' grain sizes after drying ranges from a few microns to a few millimeters, generally 50 microns to 4 millimeters.

After filtration, the particles are dried at a temperature that can be as high as 90° C.

As may be foreseen for the product, a complementary monomer such as defined above, other than one of those required for the invention, can be added at any time during the copolymerization reaction. Generally, in order to maintain the homogeneity of the final copolymer, it is recommended that this monomer be associated in a mixture with other monomers that must be added to the reaction medium. This complementary monomer must not comprise more than 5 moles in 100 moles of the total $C_2H_2F_2$—$C_2F_4$ in the mixture of reactive monomers.

The solvent selected to serve as a reaction medium should preferably not have a significant effect as a transfer agent in order to avoid the reduction of the molecular weights by too great a factor. Moreover, it is preferable that it have a solubility of more than 20% in the liquid that does not dissolve the copolymer to be used later, the ideal being that this solubility be complete. The solvent is preferably to be chosen from among the acetates or the alcohols and their mixtures, the ketones and the ether alcohols. Ethyl acetate, methyl acetate, butyl acetate, acetonitrile, methanol, and tertiobutanol are especially recommended.

Initiators of copolymerization are known as such, the most usual of them being selected from among the radical polymerization initiators such as the diisopropyl or dicyclohexyl perdicarbonates, tertiobutyl or tertioamyl perpivalate, azobisisobutyronitrile and 1'-azo-bis-2, 2-dimethylvaleronitrile.

The settable fluoridated copolymer according to the invention used as a powdered binding agent for paint must be associated with a setting agent that improves the reaction of setting by heat reticulation. This setting agent may be defined as a resin bearing functional groups that react with the acid groups of the settable copolymer. Among the possible setting agents, resins bearing epoxy groups, such as triglycidylisocyanurate, free or bound polyisocyanate resins such as isophoronediisocyanate blocked by caprolactame, or hydroxyalkylamide resins such as bis-N,N-dihydroxyethyl adipamide, might be mentioned.

Every usual additive to powdered paint may be added, whether pigments, fillers, anti-foaming agents, agents to modify the rheology, stabilizing agents, antioxidants, or others.

Powdered paint may be prepared by dry mixing the settable fluoridated copolymer with the various other constituents. In that case, each of the elements may be ground separately to the desired grain size and then mixed dry.

Another preferred method of preparation consists of melting and mixing the various constituents in an extruder. The temperature in the extruder is usually between 80° and 160° C. The cooled extrusion is granulated and then ground at room temperature.

The grain size of powdered paint depends on the method of application selected. For example, an average grain size between $25\mu$ and $40\mu$ inclusive for spraying and an average grain size of $70\mu$ to $120\mu$ for dipping in a fluidized bath.

Powdered paint may be applied by any means capable of providing the desired dispersion of the particles. In particular, any kind of electrostatic spray gun can be used in which the charged particles are propelled against a substrate bearing the opposite charge or no charge. It is also possible to use a fluidized bath, electrostatic or not, and to work by means of sprinkling or rotary milling.

The baking temperature of the coating depends on its mode of application and must be high enough to insure the coalescence of the powder grains and the setting reaction. For example, when powdered paint is sprayed from a gun, the coated substrate is baked at a temperature between 110° and 250° C. inclusive.

Powdered paint may be applied on metals such as steel, aluminum, or others, whether or not coated with primer.

The preferred primers are those based on epoxy, epoxyphenolic, (meth)acrylic, polyester, or polyester-polyurethane resins, or combinations of these resins. Their thickness is between 2 and 30 microns. They may be in powder or liquid form.

As an example of a powdered primer, we mention the composition by weight obtained by mixing:

| | |
|---|---|
| epoxy resin (480 g/eg epoxy equivalent) | 92.08 |
| methacrylic resin (TUKON hardness 15–16; Tv = 60° C.) | 4.60 |
| dicyandiamide | 3.22 |
| alumina | 0.10 |

As an example of a liquid primer, we mention the composition obtained by mixing (by weight):

| | |
|---|---|
| methacrylic resin (Tv = 60° C.; TUKON hardness 15–16), in solution in xylene (concentration 40% by weight) | 11.26 |
| epoxy resin (molecular weight = 2900; epoxy equivalent weight 1500 to 2000) in solution in ethoxy-2 ethyl acetate (concentration: 50% by weight) | 22.74 |
| epoxy resin (molecular weight = 380; epoxy equivalent weight: 180 to 200) | 3.04 |
| etherified phenolic resin (acid index 55 meq KOH/mg; dynamic viscosity: 0.25 to 0.5 Pa.s) | 2.20 |
| isocyanate compounds (blocked aliphatic isocyanates with —N=C=O content equal to 11.5%) | 1.11 |
| titanium dioxide | 22.30 |
| strontium chromate | 2.21 |
| silica | 0.22 |
| ethoxy-2 ethyl acetate | 13.53 |
| xylene | 7.13 |
| butyl acetate | 14.26 |

To judge the degree of reticulation of the film, it is subjected to a series of rubbings with cotton soaked in methyl ethyl ketone (MEK) until the substrate appears.

A number of two-way passes less than 50 denotes poor reticulation, while a number of two-way passes greater than 100 denotes excellent reticulation.

The following examples illustrate the invention but without limiting it:

EXAMPLE 1 (For Comparison)

Into a 3.3 l autoclave provided with a stirrer there are added after de-gassing under vacuum 1.9 l of ethyl acetate, 6.5 g of methacrylic acid, 390 g of $C_2H_2F_2$, and 330 g of $C_2F_4$.

The autoclave is then heated to 70° C. and 5 g of tertiobutyl perpivalate is added.

No drop in pressure occurs; a copolymer containing fluorine does not form.

EXAMPLE 2 (For Comparison)

Into a 3.3 l autoclave provided with a stirrer there are added after de-gassing under vacuum: 2 l of acetic acid, 10 g of allyloxyacetic acid, 215 g of $C_2H_2F_2$, and 84 g of $C_2F_4$. The temperature is raised to 70° C. and the pressure is 19 bars. There is then added 15 g of tertiobutyl perpivalate to initiate the reaction. A drop in pressure occurs which is compensated for by adding a mixture of $C_2H_2F_2/C_2F_4$ in the molar relationship of 65/35. Every time 44 g of this mixture is added, 6.75 g of allyloxyacetic acid is added. After 2 hours and 15 minutes of polymerization, there have thus been added 20.25 g of allyloxyacetic acid and 177 g of the $C_2H_2F_2/C_2F_4$ mixture at 65/35 molar.

After de-gassing, the autoclave is emptied and the copolymer is precipitated in a volume of 10 l of water.

The copolymer clumps together during drying at 70° C.

244 g of copolymer of molecular weight Mn=2600 is recovered, having $0.73 \cdot 10^{-3}$ COOH equivalence per gram of product.

The copolymer cannot be ground at room temperature.

EXAMPLE 3 (For Comparison)

Into a 3.3 l autoclave provided with a stirrer there are added after de-gassing 2 l of tertiobutanol, 40 g of a compound with the formula

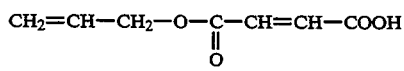

and then 215 g of $C_2H_2F_2$, and 84 g of $C_2F_4$.

The autoclave is then heated to 70° C., with a resulting pressure of 17 bars.

10 g of tertiobutyl perpivalate is then added.

No drop in pressure occurs; a polymer does not form.

EXAMPLE 4 (For Comparison)

Into a 3.3 l autoclave provided with a stirrer there are added after de-gassing 2 l of tertiobutanol, 73 g of a compound with the formula

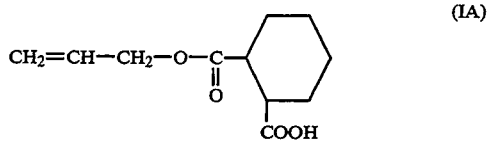

276 g of butyl vinyl ether and 360 g of $C_2F_3Cl$.

After heating the autoclave to 70° C., 10 g of tertiobutyl perpivalate is then added to initiate the polymerization.

The initial pressure is 2.8 bars. After one hour and 45 minutes of copolymerization, the pressure is 1.2 bars.

The autoclave is de-gassed and 2135 g of solution are recovered.

This solution is poured into 10 l of water, with stirring. The copolymer is very difficult to filter and completely clumps together during drying at 70° C.; it cannot be ground at room temperature and appears like chewing gum.

Analysis of the copolymer formed provides a molar composition of:

$C_2F_3Cl$: 52
butyl vinyl ether: 48
IA: 8.7

EXAMPLE 5

Into a 3.3 l autoclave provided with a stirrer there are added after de-gassing under vacuum 2.25 l of tertiobutanol, 13.5 g of a compound with the formula

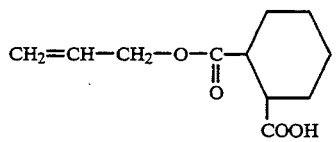

then 215 g of $C_2H_2F_2$, and 84 g of $C_2F_4$.

The autoclave is heated to 50° C., and the resulting pressure is 14 bars. 10 g of a 33% solution of isopropyl peroxydicarbonate in ethyl acetate is then added. The pressure is maintained at 14 bars by addition of a mixture of $C_2H_2F_2$ and $C_2F_4$ of a molar proportion of 65/35. Every time 44 g of the $C_2H_2F_2$—$C_2F_4$ 63/35 mixture is added, 6.6 g of the compound with formula (IA) is added. To maintain the action of copolymerization, 5 g of the solution of isopropyl per- oxydicarbonate (IPP) is added every hour.

Thus, after 5 hours and 40 minutes there has been added:
59.4 g of the compound of formula (IA)
20 g of IPP solution
443 g of the 63/35 molar $C_2H_2F_2$—$C_2F_4$ mixture.
The autoclave is cooled and de-gassed.

The copolymerization product is poured into 10 l of water, with stirring. Stirring is continued for three hours and then the precipitated copolymer is filtered on a standard filter.

The copolymer is dried in an oven for 14 hours at 70° C.

After drying, 487 g of a coarse grained powder is recovered, whose grain size varies from 200μ to 3 mm.

The molecular weights of the copolymer are measured by steric exclusion chromatography in tetrahydrofurane at 20° C.

The chromatograph is equipped with two columns, of $10^4$ and $10^5$ nm (nanometers) and a refractometric detector.

Mn=7800, expressed in polystyrene equivalents.

The rate of the carboxyl function is $0.67 \cdot 10^{-3}$ equivalents per gram of copolymer.

The RMN $F^{19}$ and H analysis of the copolymer shows that no residual saturation remains and that the ratio of $C_2H_2F_2$ to $C_2F_4$ is 65/35.

The total molar composition of the copolymer is $C_2H_2F_2/C_2F_4/(IA)$: 65/35/6.

EXAMPLE 6

Into a 3.3 l autoclave provided with a stirrer there are added after de-gassing under vacuum 2 l of methyl acetate, 10.65 g of a compound with the formula

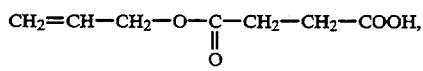

215 g of $C_2H_2F_2$, and then 84 g of $C_2F_4$.

The autoclave is heated to 50° C., and the resulting pressure is 10 bars. 10 g of a 33% solution of isopropyl peroxydicarbonate in ethyl acetate is added.

The pressure is maintained at 10 bars by addition of a mixture of $C_2H_2F_2$ and $C_2F_4$ of a molar proportion of 65/35. Every time 22 g of the $C_2H_2F_2$—$C_2F_4$ 63/35 mixture is added, 2.46 g of the compound with formula (IB) is added. To maintain the action of copolymerization, 6 g of a solution of isopropyl peroxydicarbonate (IPP) is added after one hour and 30 minutes.

Thus, after 5 hours and 40 minutes there has been added during the reaction:
46.7 g of the compound of formula (IB)
6 g of IPP solution
420 g of the 63/35 molar $C_2H_2F_2$—$C_2F_4$ mixture.
The autoclave is cooled and de-gassed.

The copolymerization product is poured into 10 l of water, with stirring. Stirring is continued for three hours. The precipitated copolymer is then filtered on a standard filter.

The copolymer is dried in an oven for 14 hours at 70° C. After drying, 500 g of a coarse grained powder is recovered, whose grain size varies from 200μ to 3 mm.

Moreover, the copolymer has following characteristics:
Mn=10,000
COOH=$0.68 \cdot 10^{-3}$ equivalents/gram
$C_2H_2F_2/C_2F_4/(IB)$=65/35/5.9 molar.

EXAMPLE 7

Into a 3.3 l autoclave provided with a stirrer there are added after de-gassing under vacuum 2 l of tertiobutanol, 40 g of a compound with the formula

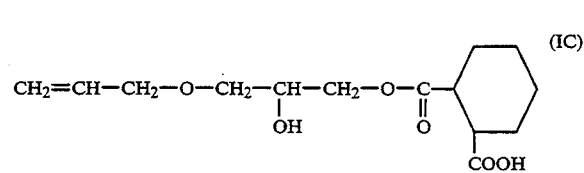

215 g of $C_2H_2F_2$, then 84 g of $C_2F_4$.

The autoclave is heated to 50° C., and the resulting pressure is 18.5 bars. 10 g of a 33% solution of tertiobutyl perpivalate is then added to initiate the reaction.

The pressure is maintained at 18.5 bars by addition of a mixture of $C_2H_2F_2$ and $C_2F_4$ of a molar proportion of 65/35.

Every time 44 g of the $C_2H_2F_2$—$C_2F_4$ 63/35 mixture is added, 7.5 g of the compound with formula (IC) is added. To maintain the action of copolymerization, 5 g of tertiobutyl perpivalate is added after one hour and 30 minutes and 3 hours of reaction time.

Thus, after 4 hours and 30 minutes there has been added:
67.5 g of the compound of formula (IC),
10 g of tertiobutyl perpivalate,
442 g of the 63/35 $C_2H_2F_2$—$C_2F_4$ mixture.
The autoclave is cooled and de-gassed.

The copolymerization product is poured into 10 l of water, with stirring. Stirring is continued for three hours and then the precipitated copolymer is filtered.

The copolymer is dried in an oven for 14 hours at 70° C. After drying, 497 g of a coarse grained powder is recovered, whose grain size varies from 200μ to 3 mm.

Moreover, the copolymer has following characteristics:
Mn=2700
COOH=$0.59 \cdot 10^{-3}$ equivalents per gram
The molar composition is $C_2H_2F_2/C_2F_4/(IC)$=65/35/5.5.

EXAMPLE 8

Into a 3.3 l autoclave provided with a stirrer there are added after de-gassing under vacuum 1.9 l of tertiobutanol, 50 g of a compound with the formula

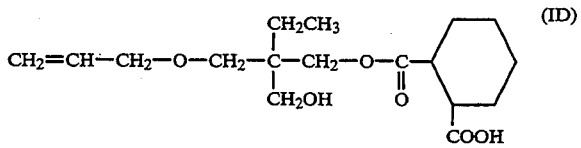

215 g of $C_2H_2F_2$, then 84 g of $C_2F_4$.

The autoclave is heated to 70° C., and the resulting pressure is 20 bars. 10 g of a 33% solution of tertiobutyl perpivalate is then added.

The pressure is maintained at 20 bars by addition of a mixture of $C_2H_2F_2$ and $C_2F_4$ of a molar composition of 65/35.

Every time 44 g of the $C_2H_2F_2$—$C_2F_4$ 63/35 mixture is added, 9.37 g of the compound with formula (ID) is added. To maintain the action of copolymerization, 4 g of tertiobutyl perpivalate is added every hour.

Thus, after 6 hours and 30 minutes there has been added:

46.9 g of the compound of formula (ID),
20 g of tertiobutyl perpivalate,
265 g of the 63/35 $C_2H_2F_2$—$C_2F_4$ mixture.

The autoclave is cooled and de-gassed.

The copolymerization product is poured into 10 of water, with stirring. Stirring is continued for three hours and then the precipitated copolymer is filtered.

The copolymer is dried in an oven for 14 hours at 70° C. After drying, 381 g of copolymer is recovered, whose particle size varies from 200μ to 3 mm.

Moreover, the copolymer has following characteristics:

Mn=4300
COOH=0.57·10$^{-3}$ equivalents per gram.
The molar composition is:
$C_2H_2F_2$/$C_2F_4$/(ID)=65/35/5.4.

EXAMPLE 9

Into a 3.3 l autoclave provided with a stirrer there are added after de-gassing under vacuum 2.1 l of tertiobutanol, 13.5 g of a compound with the formula

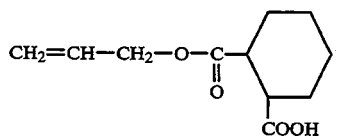

215 g of $C_2H_2F_2$, 84 g of $C_2F_4$, and then 20 g of $C_3F_6$.

The autoclave is heated to 50° C., and the resulting pressure is 15 bars. 10 g of a 33% solution of isopropyl peroxydicarbonate is then added.

The pressure is maintained at 15 bars by addition of a mixture of $C_2H_2F_2$ and $C_2F_4$ of a molar composition of 65/35. Every time 44 g of the $C_2H_2F_2$—$C_2F_4$ 63/35 mixture is added, 6.6 g of the compound with formula (IA) is added. To maintain the action of copolymerization, 5 g of the isopropyl peroxydicarbonate (IPP) solution is added every hour.

Thus, after 5 hours and 30 minutes there has been added:

59.4 g of the compound of formula (IA),
20 g of IPP solution
443 g of the 63/35 $C_2H_2F_2$—$C_2F_4$ mixture.

The autoclave is cooled and de-gassed.

The copolymerization product is poured into 10 l of water, with stirring. Stirring is continued for three hours and then the precipitated copolymer is filtered.

The copolymer is dried in an oven for 14 hours at 70° C. After drying, 497 g of a coarse-grained powder is recovered, whose particle size varies from 500μ to 3 mm.

Moreover, the copolymer has following characteristics:

Mn=8000
COOH=0.66·10$^{-3}$ equivalents per gram.
The molar composition is:
$C_2H_2F_2$/$C_2F_4$/$C_3F_6$/(IA)=64/34/2/6.

EXAMPLE 10 (For Comparison)

Into a 3.3 l autoclave provided with a stirrer there are added after de-gassing under vacuum 2 l of tertiobutanol and 30 g of 1.2 allyl oxypropanediol, 215 g of $C_2H_2F_2$, 84 g of $C_2F_4$. The temperature is increased to 70° C., and the pressure rises to 20 bars.

After addition of 5 g of tertiobutyl perpivalate to initiate polymerization, there is a drop in pressure which is compensated for by addition of a mixture of $C_2H_2F_2$ and $C_2F_4$ of a molar proportion of 65/35. Every time 89 g of the $C_2H_2F_2$—$C_2F_4$ 63/35 mixture is added, 11 g of 1.2 allyl oxypropanediol is also added.

To accelerate the action of copolymerization, 2.5 g of tertiobutyl perpivalate is added after one hour and 30 minutes of polymerization.

Thus, after 4 hours and 30 minutes there has been added 445 g of the 63/35 $C_2H_2F_2$—$C_2F_4$ molar mixture and 44 g of 1.2 allyl oxypropanediol.

The temperature is lowered and the reactor is de-gassed. The copolymerization product is precipitated in a volume of 10 l of water, and recovered by filtration. It is necessary to dry the copolymer at a temperature below 35° C., as clumping occurs when drying is done at a higher temperature.

At a temperature of 35° C. under a vacuum of 65 mbar, drying takes several days. There is therefore a great penalty for recovering this copolymer in divided form.

After drying at 30° C., 465 g of a copolymer with the following characteristics are recovered:

Mn=9000
OH=1.6·10·10$^{-3}$ equivalents per gram of copolymer.
The molar composition is:
$C_2H_2F_2$/$C_2F_4$/allyl oxypropanediol=65/35/6.9.

The copolymer can only be ground in a cryogenic grinder at low temperature.

EXAMPLE 11 (For Comparison)

Into a 3.3 l autoclave provided with a stirrer there are added after de-gassing under vacuum 2 l of tertiobutanol, 20 g of allyl oxypropanediol, 8 g of a compound with the formula IA

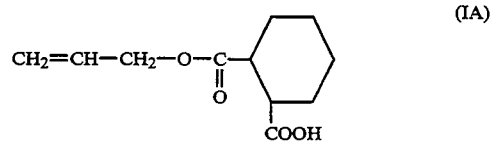

then 215 g of $C_2H_2F_2$ and 84 g of $C_2F_4$. The temperature is raised to 70° C., and the pressure reaches 17 bars.

After addition of 10 g of tertiobutyl perpivalate to begin the polymerization, there is a drop in pressure which is compensated for by addition of a 65/35 mixture of $C_2H_2F_2$ and $C_2F_4$.

Every time 22 g of the $C_2H_2F_2$—$C_2F_4$ 63/35 mixture is added to maintain the pressure, 4.5 g of 1.2 allyl oxypropanediol and 1.5 g of compound IA is added.

After 6 hours and 30 minutes, 445 g of the 63/35 $C_2H_2F_2$—$C_2F_4$ mixture, 85.5 g of ally oxypropanediol, and 28.5 g of the compound of formula IA have been added. To accelerate the action of polymerization, 10 g of tertiobutyl perpivalate is added during polymerization.

The temperature is then lowered and the reactor de-gassed.

The copolymerization product is precipitated in a volume of 10 l of water, and recovered by filtration.

It is impossible to obtain this copolymer in divided form after drying at 70° C. The copolymer is completely melted and behaves like a viscous liquid at a temperature of 70° C.

After drying, 500 g of a copolymer with the following characteristics are recovered:
Mn=6000
OH=$1.7 \cdot 10^{-3}$ equivalents per gram
COOH=$0.31 \cdot 10^{-3}$ equivalents per gram.
The molar composition of the copolymer is:
$C_2H_2F_2$/$C_2F_4$/allyl oxypropanediol/compound IA=65/35/7.9/2.9

The copolymer cannot be ground at room temperature.

EXAMPLE 12

The copolymer of Example 5 is ground at room temperature with a PALLMAN PPL$_{18}$ ® grinder to provide a powder with an average grain size of 35 microns.

The triglycidyl isocyanurate (TGIC) is ground separately in the same way to yield a powder of average grain size of 35 microns.

The paint powder is prepared by mixing:
300 g of the ground copolymer of Example 5,
21 g of ground TGIC,
0.35 g of alumina,
32.1 g of green chromium oxide GX for 90 seconds at 1000 RPM.

The resulting mixture is screened to eliminate particles larger than 280 microns.

The powder is applied to a chromated aluminum plate 0.7 mm thick with an electrostatic RANSBURG GEMA PGC1 ® spray gun.

The application tension is −50 KV, the air pressure is 2 kg/cm², and the air flow rate is 6 m³/h.

The plate is baked for 12 minutes at 200° C. and then cooled to room temperature to yield a film 65 microns thick.

The Persoz hardness measured according to NFT 30-016 is 160 s.

The specular gloss at 60° measured according to ASTM D 523-85 is 35%.

The resistance to methyl ethyl ketone is greater than 100 two-way passes.

Adhesiveness measured according to NFT 30-038 is Class 0.

EXAMPLE 13

Into a HENSCHELL ® mixer are successively placed:
6000 g of the copolymer of Example 5,
420 g of TGIC,
7 g of alumina,
642 g of green chromium oxide GX that are roughly pre-mixed for 90 seconds at 830 RPM.

This pre-mixture is fed into a Clextral twin-screw BC 21 ® extruder equipped with kneading elements. The rotation speed is 400 RPM. The temperature of the casing is 100° C. The temperature of the screw is 120° C.

The extrudate is cooled by immersion in water at 20° C. and then granulated on a LANCELIN ®.

The granules are ground at room temperature with a PALLMAN PPL18 ® grinder to yield a powder of average grain size 35 microns.

The resulting powder is screened to eliminate particles larger than 280 microns.

The powder is applied to a chromated aluminum plate 0.7 mm thick with an electrostatic RANSBURG GEMA PGC1 ® spray gun.

The application tension is −50 KV, the air pressure is 2 kg/cm², and the air flow rate is 6 m³/h.

The plate is baked for 10 minutes at 200° C. and then cooled to room temperature to yield a film 65 microns thick.

The Persoz hardness measured according to NFT 30-016 is 160 s.

The specular gloss at 60° measured according to ASTM D 523-85 is 35%.

The resistance to methyl ethyl ketone is greater than 100 two-way passes.

Adhesiveness measured according to NFT 30-038 is Class 0.

EXAMPLE 14

The copolymer of Example 5 is ground at room temperature with a PALLMAN PPL18 ® grinder to yield a powder of average grain size 35 microns.

Bis-(N,N-dihydroxyethyl)-adipamide (HEA) is ground separately in the same way to yield a powder of average grain size 35 microns.

The paint powder is prepared by mixing:
300 g of the ground copolymer of Example 1 [sic!],
15.8 g of ground HEA,
0.35 g of alumina,
31.5 g of green chromium oxide GX for 90 seconds at 1000 RPM.

The resulting mixture is screened to eliminate particles larger than 280 microns.

The powder is applied to a chromated aluminum plate 0.7 mm thick with an electrostatic RANSBURG GEMA PGC1 ® spray gun.

The application tension is −50 KV, the air pressure is 2 kg/cm², and the air flow rate is 6 m³/h.

The plate is baked for 25 minutes at 150° C. and then cooled to room temperature to yield a film 70 microns thick.

The Persoz hardness measured according to NFT 30-016 is 165 s.

The specular gloss at 60° measured according to ASTM D 523-85 is 38%.

The resistance to methyl ethyl ketone is greater than 100 two-way passes.

Adhesiveness measured according to NFT 30-038 is Class 0.

EXAMPLE 15

The copolymer of Example 6 is ground at room temperature with a PALLMAN PPL18 ® grinder to yield a powder of average grain size 35 microns.

Triglycidyl isocyanurate (TGIC) is ground separately in the same way to yield a powder of average grain size 35 microns.

The paint powder is prepared by mixing:
300 g of the ground copolymer of Example 6,
21 g of ground TGIC,
0.35 g of alumina,
32.1 g of green chromium oxide GX for 90 seconds at 1000 RPM.

The resulting mixture is screened to eliminate particles larger than 280 microns.

The powder is applied to a galvanized steel plate 0.8 mm thick previously coated with 8 μm of an epoxy based primer as defined above with an electrostatic RANSBURG GEMA PGC1 ® spray gun.

The application tension is −50 KV, the air pressure is 2 kg/cm$^2$, and the air flow rate is 6 m$^3$/h.

The plate is baked for 12 minutes at 200° C. and then cooled to room temperature to yield a film 65 microns thick.

The Persoz hardness measured according to NFT 30-016 is 185 s.

The specular gloss at 60° measured according to ASTM D 523-85 is 40%.

The resistance to methyl ethyl ketone is greater than 100 two-way passes.

Adhesiveness measured according to NFT 30-038 is Class 0.

EXAMPLE 16

The copolymer of Example 7 is ground at room temperature with a PALLMAN PPL18 ® grinder to yield a powder of average grain size 27 microns.

Triglycidyl isocyanurate (TGIC) is ground separately in the same way to yield a powder of average grain size 35 microns.

The paint powder is prepared by mixing:
300 g of the ground copolymer of Example 7,
18.6 g of ground TGIC,
0.35 g of alumina,
31.8 g of green chromium oxide GX for 90 seconds at 1000 RPM.

The resulting mixture is screened to eliminate particles larger than 280 microns.

The powder is applied to a chromated aluminum plate 0.7 mm thick with an electrostatic RANSBURG GEMA PGC1 ® spray gun.

The application tension is −50 KV, the air pressure is 2 kg/cm$^2$, and the air flow rate is 6 m$^3$/h.

The plate is baked for 15 minutes at 200° C. and then cooled to room temperature to yield a film 58 microns thick.

The Persoz hardness measured according to NFT 30-016 is 140 s.

The specular gloss at 60° measured according to ASTM D 523-85 is 20%.

The resistance to methyl ethyl ketone is greater than 100 two-way passes.

Adhesiveness measured according to NFT 30-038 is Class 0.

EXAMPLE 17

The copolymer of Example 8 is ground at room temperature with a PALLMAN PPL18 ® grinder to yield a powder of average grain size 30 microns.

Triglycidyl isocyanurate (TGIC) is ground separately in the same way to yield a powder of average grain size 35 microns.

The paint powder is prepared by mixing:
300 g of the ground copolymer of Example 8,
18 g of ground TGIC,
0.35 g of alumina,
31.8 g of green chromium oxide GX for 90 seconds at 1000 RPM.

The resulting mixture is screened to eliminate particles larger than 280 microns.

The powder is applied to a chromated aluminum plate 0.7 mm thick with an electrostatic RANSBURG GEMA PGC1 ® spray gun.

The application tension is −50 KV, the air pressure is 2 kg/cm$^2$, and the air flow rate is 6 m$^3$/h.

The plate is baked for 15 minutes at 200° C. and then cooled to room temperature to yield a film 60 microns thick.

The Persoz hardness measured according to NFT 30-016 is 150 s.

The specular gloss at 60° measured according to ASTM D 523-85 is 25%.

The resistance to methyl ethyl ketone is greater than 100 two-way passes.

Adhesiveness measured according to NFT 30-038 is Class 0.

EXAMPLE 18

Into a HENSCHELL ® mixer are successively placed:
6000 g of the copolymer of Example 9,
414 g of TGIC,
7 g of alumina,
642 g of green chromium oxide GX that are roughly pre-mixed for 90 seconds at 830 RPM.

This pre-mixture is fed into a Clextral twin-screw BC 21 ® extruder equipped with kneading elements. The rotation speed is 400 RPM. The temperature of the casing is 100° C. The temperature of the screw is 120° C.

The extrudate is cooled by immersion in water at 20° C. and then granulated on a LANCELIN ®.

The granules are ground at room temperature with a PALLMAN PPL18 ® grinder to yield a powder of average grain size 35 microns.

The powder is applied to a chromated aluminum plate 0.7 mm thick with an electrostatic RANSBURG GEMA PGC1 ® spray gun.

The application tension is −50 KV, the air pressure is 2 kg/cm$^2$, and the air flow rate is 6 m$^3$/h.

The plate is baked for 12 minutes at 200° C. and then cooled to room temperature to yield a film 65 microns thick.

The Persoz hardness measured according to NFT 30-016 is 190 s.

The specular gloss at 60° measured according to ASTM D 523-85 is 33%.

The resistance to methyl ethyl ketone is greater than 100 two-way passes.

Adhesiveness measured according to NFT 30-038 is Class 0.

We claim:
1. A hardenable fluoridated copolymer of tetrafluoroethylene, vinylidene fluoride, and an allylic monomer of the formula

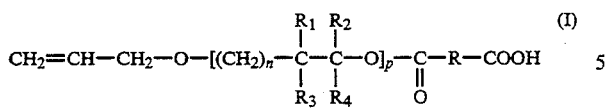

(I)

wherein

R is an unsaturated linear, branched, or cyclic alkyl chain having 2 to 12 carbon atoms, each of R1, R2, R3, and R4 is independently selected from the group consisting of H, $CH_3$, $CH_2CH_3$, OH, and $CH_2OH$, n is 0 or 1, and p is a value from 0 to 3.

2. A hardenable fluoridated copolymer according to claim 1 wherein the relative molar proportion of tetrafluoroethylene to vinylidene fluoride ranges from 15/85 to 55/45.

3. A hardenable fluoridated copolymer according to claim 1 wherein the relative molar proportion of tetrafluoroethylene to vinylidene fluoride ranges from 15/85 to 55/45 and the molar proportion of said allylic monomer to said tetrafluoroethylene and vinylidene fluoride ranges from 3/100 to 20/100.

4. A hardenable fluoridated copolymer according to claim 3 wherein said allylic monomer is selected from the group consisting of those having the formulas

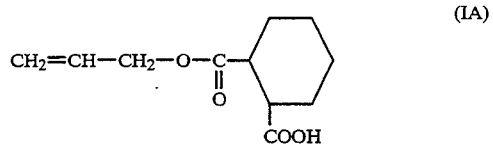

(IA)

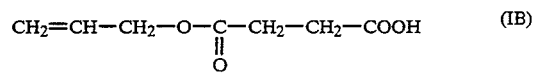

(IB)

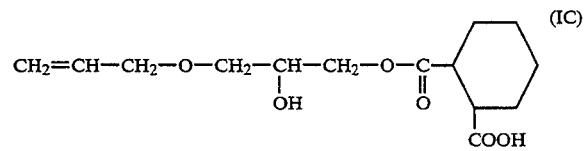

(IC)

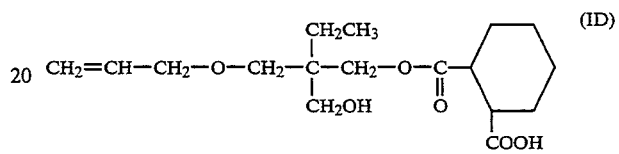

(ID)

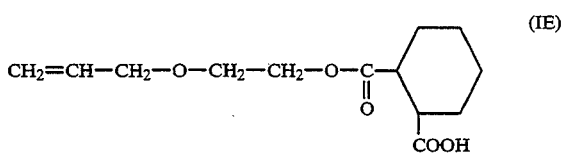

(IE)

5. A hardenable fluoridated copolymer according to claim 1 in the form of dispersed particles that are easily grindable into powder at room temperature.

6. A hardenable fluoridated copolymer according to claim 1 having a molecular weight of from 2500 to 30,000.

7. A powder for electrostatic spray coating comprising a copolymer in accordance with claim 1.

8. A powder for electrostatic spray coating comprising a copolymer in accordance with claim 5.

* * * * *